US007617326B2

(12) United States Patent
Gervais et al.

(10) Patent No.: US 7,617,326 B2
(45) Date of Patent: Nov. 10, 2009

(54) SYSTEM AND METHOD FOR UTILIZING MULTICAST IP AND ETHERNET TO LOCATE AND DISTRIBUTE A SATELLITE SIGNAL

(75) Inventors: John Alan Gervais, Carmel, IN (US); Terry Wayne Lockridge, Dayton, OH (US)

(73) Assignee: Thomson Licensing, Boulogne-Billancourt (FR)

( * ) Notice: Subject to any disclaimer, the term of this patent is extended or adjusted under 35 U.S.C. 154(b) by 837 days.

(21) Appl. No.: 10/549,825

(22) Filed: Sep. 20, 2005

(65) Prior Publication Data

US 2006/0235993 A1    Oct. 19, 2006

Related U.S. Application Data (60) Provisional application No. 60/456,049, filed on Mar. 20, 2003.

(51) Int. Cl.
*G06F 15/16* (2006.01)
(52) U.S. Cl. .................. 709/231; 709/238; 709/217; 370/351; 370/389
(58) Field of Classification Search .......... 709/238, 709/231, 217–219; 370/351, 389
See application file for complete search history.

(56) References Cited

U.S. PATENT DOCUMENTS

| 5,864,358 | A | * | 1/1999 | Suzuki et al. ............. 370/486 |
| 6,018,764 | A | * | 1/2000 | Field et al. .................. 709/217 |
| 6,351,467 | B1 | * | 2/2002 | Dillon ........................ 709/219 |
| 6,501,423 | B2 | | 12/2002 | Kelly et al. |
| 6,744,789 | B1 | * | 6/2004 | Michener ................... 370/509 |
| 6,993,008 | B2 | * | 1/2006 | Birdwell et al. ............ 370/349 |
| 7,039,048 | B1 | * | 5/2006 | Monta et al. ............... 370/389 |
| 7,174,373 | B1 | * | 2/2007 | Lausier ..................... 709/223 |
| 7,237,017 | B1 | * | 6/2007 | Pecus et al. ............... 709/223 |
| 2001/0025377 | A1 | | 9/2001 | Hinderks |
| 2002/0073167 | A1 | * | 6/2002 | Powell et al. ............. 709/217 |
| 2003/0112878 | A1 | * | 6/2003 | Kloper ....................... 375/259 |

OTHER PUBLICATIONS

Search Report Dated Sep. 3, 2004.

* cited by examiner

*Primary Examiner*—Philip B Tran
(74) *Attorney, Agent, or Firm*—Robert D. Shedd; Joseph J. Opalach; Catherine A. Ferguson (57) ABSTRACT

A system and method for distributing satellite television program signals utilizes IP and Ethernet multicast addresses to define and allow the acquisition and/or distribution of a particular satellite television program signal. The satellite program identification data or parameters for the particular satellite program signal are encoded by an IP multicast address assigned to the particular satellite television program signal from a block of IP multicast addresses, preferably by a mini head end. The assigned IP multicast address is mapped to an Ethernet IP address for distribution to an Ethernet compatible component such as a satellite signal receiver or set top box. In this manner, any and all satellite program signals may be provided to one or more satellite signal receivers through IP multicasting.

26 Claims, 4 Drawing Sheets

| PARAMETER | RANGE DECIMAL | RANGE HEXADECIMAL |
|---|---|---|
| SATELLITE | 0..7 | 0x00..0x07 |
| TRANSPONDER | 0..31 | 0x00..0x1F |
| PID OR SCID | 0..8191 | 0x00..0x1FFFF |

FIG. 4

| IPV4 BITS | ALLOCATION |
|---|---|
| 0..12 | PID OR SCID |
| 13..15 | SATELLITE NUMBER |
| 16..17 | RESERVED FOR WELL KNOWN MULTICAST ADDRESSES |
| 18..22 | TRANSPONDER (0 TO 31) |
| 23..31 | RESERVED FOR WELL KNOWN MULTICAST ADDRESSES & MULTICAST |

FIG. 5

| 31..28 | 27..24 | 23......20 | 19......16 | 15....12 | 11..8 | 7..0 | 3..0 |
|---|---|---|---|---|---|---|---|
| 1110 | 0000 | 0 000 | 01 11 | 001 0 | 0000 | 0000 | 1100 |
| RESERVED | | | RS | SAT | PID | | |
| TRANSPONDER | | | | | | | |
| MULTICAST ADDRESS | | | | | | | |
| 224.7.32.12 | | | | | | | |

FIG. 6

SYSTEM AND METHOD FOR UTILIZING MULTICAST IP AND ETHERNET TO LOCATE AND DISTRIBUTE A SATELLITE SIGNAL

This application claims the benefit, under 35 U.S.C. § 365 of International Application PCT/US04/08679, filed Mar. 19, 2004, which was published in accordance with PCT Article 21(2) on Oct. 7, 2004 in English and which claims the benefit of U.S. provisional patent application No. 60/456,049, filed Mar. 20, 2003.

BACKGROUND

1. Field of the Invention

The present invention relates to distribution and/or receipt of video program signals and, more particularly, to distribution and/or receipt of satellite television signals, over a network utilizing multicasting IP and Ethernet protocols.

2. Related Art

With the proliferation of the Internet and broadband networks, sending digital video, audio and/or data over an IP (Internet Protocol) network is becoming very advantageous. IP networks provide a structured protocol transport structure that may be exploited to provide one or more different data streams over a network each data stream of which may be acquired by one or more receivers connected to the network. This is known as multicasting. Multicasting IP datagrams are transmitted to a host group, a set of zero or more hosts identified by a single IP destination address. The IP datagram is then delivered to all members of its destination host group (corresponding to an IP multicast address).

By utilizing multicast networking, one digital data server can direct content to multiple clients simultaneously. This optimizes bandwidth use, which would otherwise require unicasting packets to several clients (i.e. providing a bit stream of packets or data to each individual address).

If the source of the digital data is a satellite system, a user, through the user's satellite receiver, set top box or the like, must select a specific satellite, transponder and PIDs (or SCIDs) to request the proper data packets in order to acquire a particular channel or program. The program is transmitted from the satellite in the form of packetized program streams, wherein the specific program streams associated with a particular program having identification information, such as program ID (PID) included therein. Using the identification information, the satellite receiver filters out the packetized data stream to acquire the desired program stream. The satellite receiver must thus be able to make the proper selection of program bit stream or signal for the requested satellite channel or program. The satellite receiver may be connected to various client set top boxes, which may be coupled to display devices, through a data network, such as an Ethernet based network.

An approach in order to have the satellite receiver select the appropriate satellite channel is to have the digital server generate a mapping table of parameters of each satellite transmitted channel to each assigned IP address. When the receiver or set top box is commanded to tune to a particular elementary stream (channel or the like), the set top box would do a table look-up to determine the address to which to request data.

A disadvantage to this method is in the processing time wasted in generating this table, downloading this table to the client set top box(es), and in the set top box performing the table look-up during tuning. Additionally, this table may need to be regenerated and re-downloaded when new elementary stream information becomes available or existing elementary stream data is no longer available. Moreover, this table would consume valuable memory on both the digital data server and the client set top box.

It is thus evident from the above discussion that what is needed is an efficient manner of distributing satellite program signals from a data server to multiple clients.

It is thus further evident from the above discussion that what is needed is an efficient satellite television distribution system that efficiently provides multiple satellite television signals to any one or more satellite or set top box receivers.

This need and others are accomplished through application of the principles of the subject invention and/or as embodied in one or more various forms and/or structures such as are shown and/or described herein.

SUMMARY

IP and Ethernet multicast addresses are utilized to uniquely describe specific satellite signals on which a digital television receiver can tune and acquire elementary stream (audio, video and/or data) packets. Available bits in the IP multicast address and the corresponding Ethernet multicast address are mapped to an elementary stream's satellite signal identification data. Embedding these parameters (elementary stream's satellite signal identification data) into the multicast address itself provides a convenient and efficient method for mapping between the satellite parameters and those of the IP/Ethernet domain.

Mapping available bits in the IP multicast address and the corresponding Ethernet multicast address to an elementary stream's characteristics (satellite signal identification data such as satellite, transponder and PIDs or SCIDs) to request proper multicast IP packets overcomes the problems noted above. This alleviates the need for more time consuming and complex solutions such as the one described above wherein the client first downloads and parses a table that maps these parameters from service information to the appropriate multicast address(es). An advantageous feature of the present invention is that the video server, or satellite receiver, and the client terminal both use the same predetermined algorithm for mapping the program stream identification information with the multicast address so there is no need to distribute mapping tables.

In one form, there is provided a method of receiving a packetized program stream from a satellite source and distributing the packetized program stream through a data network, comprising the steps of: receiving a plurality of packetized program streams from the satellite source, each packetized program stream having associated therewith program identification information; receiving a request for a particular packetized program stream, the request including a multicast address; determining program identification information and satellite identification information associated with the particular packetized program stream using a predetermined algorithm and the multicast address; tuning to a selected satellite and acquiring the particular packetized program stream using the determined satellite identification information and the program identification information; and transmitting, on the data network, the particular packetized program stream in accordance with a transport format associated with the data network using the multicast address.

The data network may comprise an Ethernet based network, and the program stream is transmitted after encapsulating the particular packetized program stream according to the Internet Protocol transport format. Also the multicast address may be determined from the program ID (PID), satellite number, and transponder number.

In another embodiment, the invention provides a method of receiving a packetized program stream and distributing the packetized program stream through a data network, comprising the steps of: receiving a plurality of packetized program streams from a signal source, each packetized program stream having associated therewith program identification information; receiving a request for a particular packetized program stream, the request including a multicast address; determining program identification information associated with the particular packetized program stream using a predetermined algorithm and the multicast address; acquiring the particular packetized program stream using the determined program identification information; and transmitting, on the data network, the particular packetized program stream in accordance with a transport format associated with the data network using the multicast address.

In another embodiment, the invention provides a method for receiving a packetized program signal in a data network, comprising the steps of: receiving a user request for a particular packetized program stream from a plurality of packetized program streams; determining a multicast address associated with the particular packetized program stream using a predetermined algorithm and identification information associated with the particular packetized program information; transmitting a request for the particular packetized program stream, the request including the multicast address, to a device coupled to a source of the plurality of packetized program streams; acquiring, from the data network, packetized data having the particular program stream included therein and being associated with the multicast address; and deriving the packetized program stream from the acquired packetized data.

In another embodiment, the invention provides a method of receiving a packetized program stream from a signal source and distributing the packetized program stream through a data network, comprising the steps of: a) receiving, in a first device coupled to the data network, a plurality of packetized program streams from the signal source; b) receiving, in a second device coupled to the data network, a user input selecting a particular packetized program stream from the plurality of packetized program streams; c) determining, in the second device, a multicast address associated with the particular packetized program stream using a predetermined algorithm, and transmitting a request for the particular packetized program stream including the determined multicast address to the first device; d) determining, in the first device, identification information associated with the particular packetized program stream in response to the request using the predetermined algorithm and the multicast address; e) acquiring, in the first device, the particular packetized program stream in response to the identification information, and transmitting the particular packetized program stream through the data network in accordance with a transport format of the data network using the multicast address; and f) receiving, in the second device, the particular packetized program stream in response to packetized data transmitted with the multicast address.

BRIEF DESCRIPTION OF THE DRAWINGS

The invention is further described with reference to the following drawings, wherein.

Corresponding reference characters tend to indicate corresponding parts throughout the several views.

DETAILED DESCRIPTION

Figure 1:
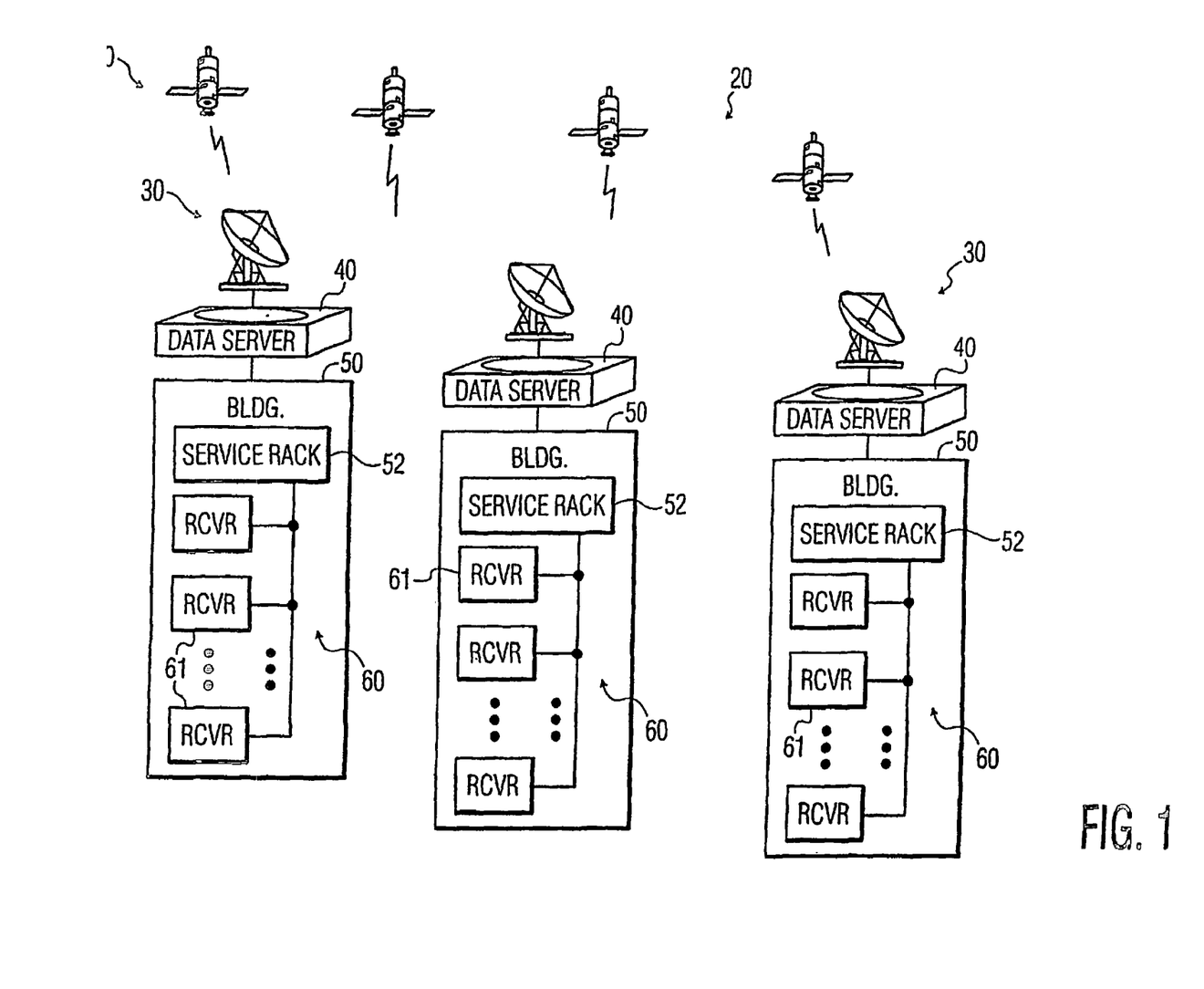
FIG. 1 is a representation an exemplary satellite signal distribution system in which the subject invention may be embodied.

Referring now to FIG. 1, there is depicted a representation of an exemplary satellite signal distribution system generally designated 10. The satellite signal distribution system 10 is representative of various types of satellite systems for the delivery of digital audio, video, audio/video and/or data signals (collectively, digital television signals or program signals) from one or more satellites 20 to one or more ground based antennas 30. The digital satellite television signals are typically in the form of digital elementary stream packets (simply elementary stream packets). One or more satellite(s) 20 form a transmission portion of the satellite system 10. One or more antenna(s) 30 form a receiving portion of the satellite system 10. Each antenna 30 is connected to a digital server, headend or signal processing and distribution component (collectively, digital server) 40. One or more digital server(s) 40 form a processing and distribution portion of the satellite system 10. A representative satellite system may thus be composed of a transmission portion, a receiving portion and a processing and distribution portion (i.e. one or more of each of a satellite, a receiver, and a processing and distribution component) each containing one or more components. Multiple satellite systems may likewise make up a satellite system in accordance with the present principles.

Each satellite 20 has one or more transponders, and preferably multiple transponders, each one of which transmits a satellite signal or elementary stream packets in digital form. Each transponder of a satellite transmits a satellite signal or channel that is composed of digital elementary stream packets of audio, video, audio/video and/or data. For ease of understanding and not to be limiting, such digital satellite signal, channel, program and/or elementary stream packets of audio. video, audio/video and/or data will be collectively termed satellite television signals, or transmitted satellite television signals. The transponders transmit the satellite television signals according to a particular digital transmission protocol and/or format. In the present case, the satellites 20 transmit in an MPEG (e.g. MPEG2) digital protocol/format or in a DirecTV digital protocol/format. Of course other digital protocols/formats could be used. Each satellite signal includes the program data and identification data. The identification data includes information in the form of satellite number or identification, transponder number or identification, and transport protocol format program identifiers (PIDs in the case of MPEG signals, or SCIDs in the case of DirecTV signals).

Each antenna 30 is adapted, configured and/or operable to receive the satellite television signals transmitted from the satellites 20. Each antenna 30 is preferably configured to receive multiple television channels or signals from multiple transponders. It should be appreciated that a single antenna 30 represents multiple antennas if necessary to receive satellite signals from several satellites at once. Each antenna 30 is connected to a data server 40. A data server 40 may be considered a miniature or mini (i.e. scaled down) head end. The data server 40 performs functions typical of such data servers in addition to those features described herein.

Each data server 40 is adapted, configured and/or operable to receive the plurality of satellite television signals (elementary streams) and process them accordingly. Particularly, the data server 40 is operable to encapsulate the received satellite television signals in the first transport protocol (e.g. MPEG or DirecTV) into packetized data according to a second transport protocol (i.e. IP transport). Thus, the elementary stream packets of each of the satellite signals or channels of the first transport protocol received from the satellites are in effect converted into elementary stream packets of a second transport protocol.

Additionally, the digital server 40 is further operable to assign a unique IP multicast address to each satellite signal (elementary streams) from a given group of available IP multicast addresses. The assigning of a multicast address is according to a schema whereby satellite identification data (satellite elementary stream packets or satellite signal identification data) is encoded or mapped to the assigned unique IP multicast address. Particularly, certain (available) bits of the assigned unique IP multicast address are used to encode the satellite signal identification data of the satellite signal to which it is assigned. In this manner, the IP multicast address includes the satellite identification data through mapping, encoding or correlating of the identification data to certain bits of the address. Preferably, but not necessarily, the identification data includes three (3) parameters to control which elementary stream(s) to tune to: 1) satellite number; 2) transponder; and 3) PIDs or SCIDs-program identifiers (transport protocol format program identifiers) of the MPEG or DirecTV protocol format.

These parameters each have a restricted or finite practical range of values. For an MPEG PID, for example, the range of values is bounded from 0 to 8191 (or from 0x0000 to 0x1fff in hexadecimal) by the MPEG2 specification (see ISO 13818). For a DirecTV SCID, for example, the range of values is bounded by 0 to 4095 (or from 0x0000 to 0x0fff in hexadecimal). To make things simple, a bounded range of 0 to 8191 may be chosen for the PID/SCID data to be encoded into the IP multicast address in order to accommodate room for both systems.

The number of transponders typically available on one satellite is thirty-two (32). Since no satellite would contain zero transponders, valid transponders may be numerically represented in a number range as 0 to 31. If the transponders are actually numbered 1 to 32, a subtraction of "1" would yield the correct transponder number in order to fall within the 0 to 31 number range.

Figure 3:
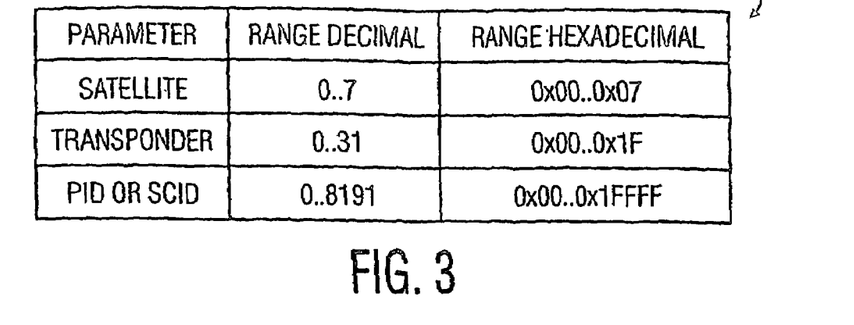
FIG. 3 is a table illustrating satellite tuning parameters in accordance with an aspect of the principles of the subject invention.

Practical limitations on antenna mounting and the cost to the service provider limits the number of satellites available to a single receiver set top box, satellite receiver, or equivalent device/component. Setting an upper bound of eight (8) satellites (or less) provides a wide range of flexibility for the service provider and customer. The eight satellites may be number from 0 to 7. FIG. 3 depicts these three parameters of the satellite identification data are listed with its decimal range and the equivalent hexadecimal range within the chart 80. Of course, other decimal and thus hexadecimal ranges may be utilized. While various IP multicast address schemes may be employed, the present invention will be described with respect to the thirty-two (32) bit IPv4 multicast address.

The data server 40 is further operable to convert the assigned IP multicast address into an Ethernet multicast address in order to provide the elementary stream packets (satellite signals) over an Ethernet network. The assigned IPv4 multicast address is mapped into the forty-eight (48) bit Ethernet address. Particularly, the data server 40 maps the available bits in the 32-bit IPv4 multicast address into corresponding bits of the 48-bit Ethernet address. For compatibility with other multicasting networks, an address mapping is selected that is compatible with the Internet Group Management Protocol (IGMP) of RFC1112 and RFC2236. RFC1112 states that "an IP host group address is mapped to an Ethernet multicast address by placing the low-order 23-bits of the IP address into the low-order 23 bits of the Ethernet multicast address 01-00-5E-00-00-00 (hex)." The IP multicast address is thus converted into an Ethernet multicast address by mapping the lower 23 bits of the IP multicast address into the lower-order 23 bits of an Ethernet multicast address. This alleviates the need for an independent mapping for the corresponding Ethernet multicast address.

Figure 4:
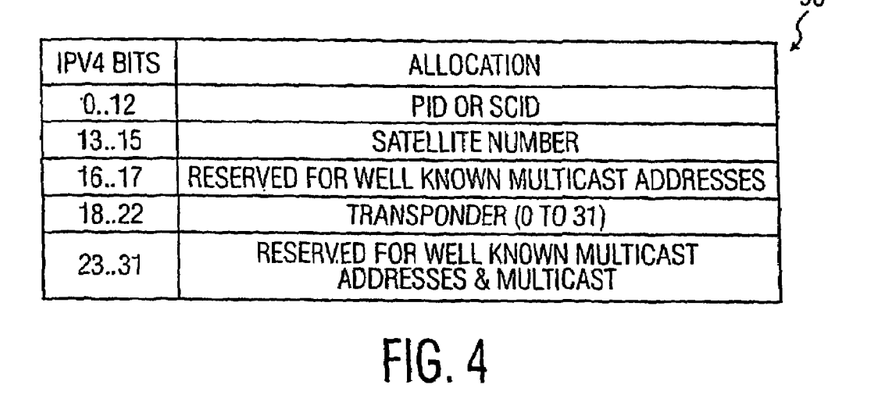
FIG. 4 is a table of IPv4 address bit allocation in accordance with an aspect of the principles of the subject invention.

As an example of the operation of the data server 40, suppose the IPv4 multicast addresses of 224.3.0.0 to 224.251.255.255 are available from the reserved group of IPv4 multicast addresses so as to avoid conflicts. If the IP multicast bits are numbered from 0 to 31, the bits 0 to 12 may be used to store (encode or map) the PID or SCID. Bits 13-15 may be used to store (encode or map) the satellite number. Bits 18 to 22 may then be used to store (encode or map) the transponder number. These bit allocations are summarized in the chart 90 of FIG. 4.

Referring back to FIG. 1, each digital server 40 may be, in turn, connected to a service rack 52 that is typically within a building 50 or the like. The service rack provides an interface with a network 60 that includes a plurality of receivers, set top boxes or the like 61 each one of which is Ethernet capable as well as being able to process satellite signals (i.e. distributed satellite signals or elementary stream packets of the IP format). Alternatively, the digital server 40 and service rack 52 may be embodied within a single package. Each receiver 61 is operable to tune to one or more satellite elementary stream packets via its IP/Ethernet multicast address. The service rack 52 may provide program or service guide information to the receivers 61 either through the data servers 40 or telephone lines connected to the service rack 52 (see FIG. 2).

Figure 5:
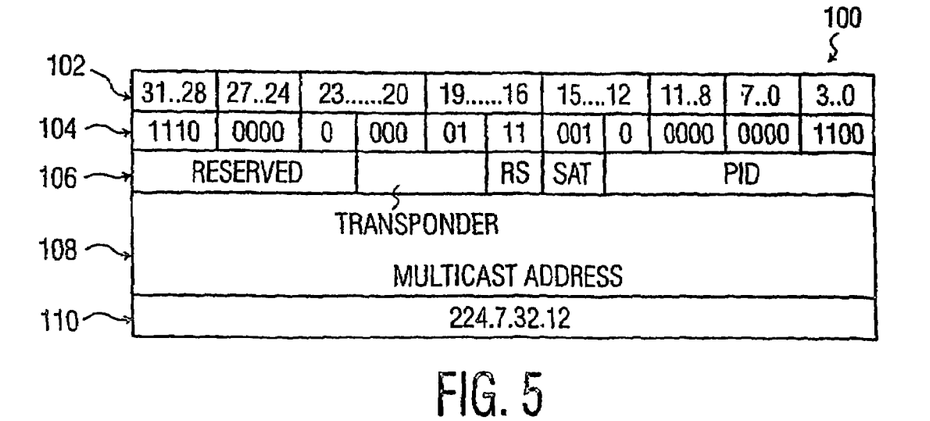
FIG. 5 is a representation of a manner of translating service (program guide) information as requested by a channel change into an IP multicast address for acquiring the requested channel bit stream.

An example of how a receiver 61 may acquire one or more elementary streams (satellite signals, programming or channels) is now discussed with the aid of FIG. 5. Using the IP multicast address range 224.3.0.0 to 224.251.255.255, a set top box 61 is issued a command to change channels typically from a remote control. The set top box 61 then leaves any current multicast group. The satellite channel information is extracted from the local program or service guide information provided to the set top box 61. The extracted channel information may indicate that the selected satellite channel is from satellite 1, transponder 1, PID 12. To join the appropriate multicast group, the set top box 61 translates the guide information into an Ethernet/IP multicast address. Chart 100 of FIG. 5 depicts how this is accomplished. A notable feature of the present invention is that the method of mapping the program identification parameters into the multicast address is done in the same manner as described above, with respect to the digital server. In this manner, both the client terminals, or receiver 61, and the digital server 40 utilize the same mapping technique, and as such, there is no need to download mapping tables and perform look up operations when a new channel or program is selected by the user.

The row 102 represents the bit number of the IP multicast address. The row 104 represents the parameters gleaned from the program guide in the appropriate designated spots (bits) as represented by row 106. Row 108 represents the total IP multicast address which is translated to the address of row 110, i.e. 224.7.32.12. The set top box 61 thus executes a command to join the multicast group at address 224.7.32.12. The multicast address may be used, in turn by the digital server, in response to the user selection, to tune to a specific satellite, a specific transponder, and a specific packetized program stream.

Figure 2:
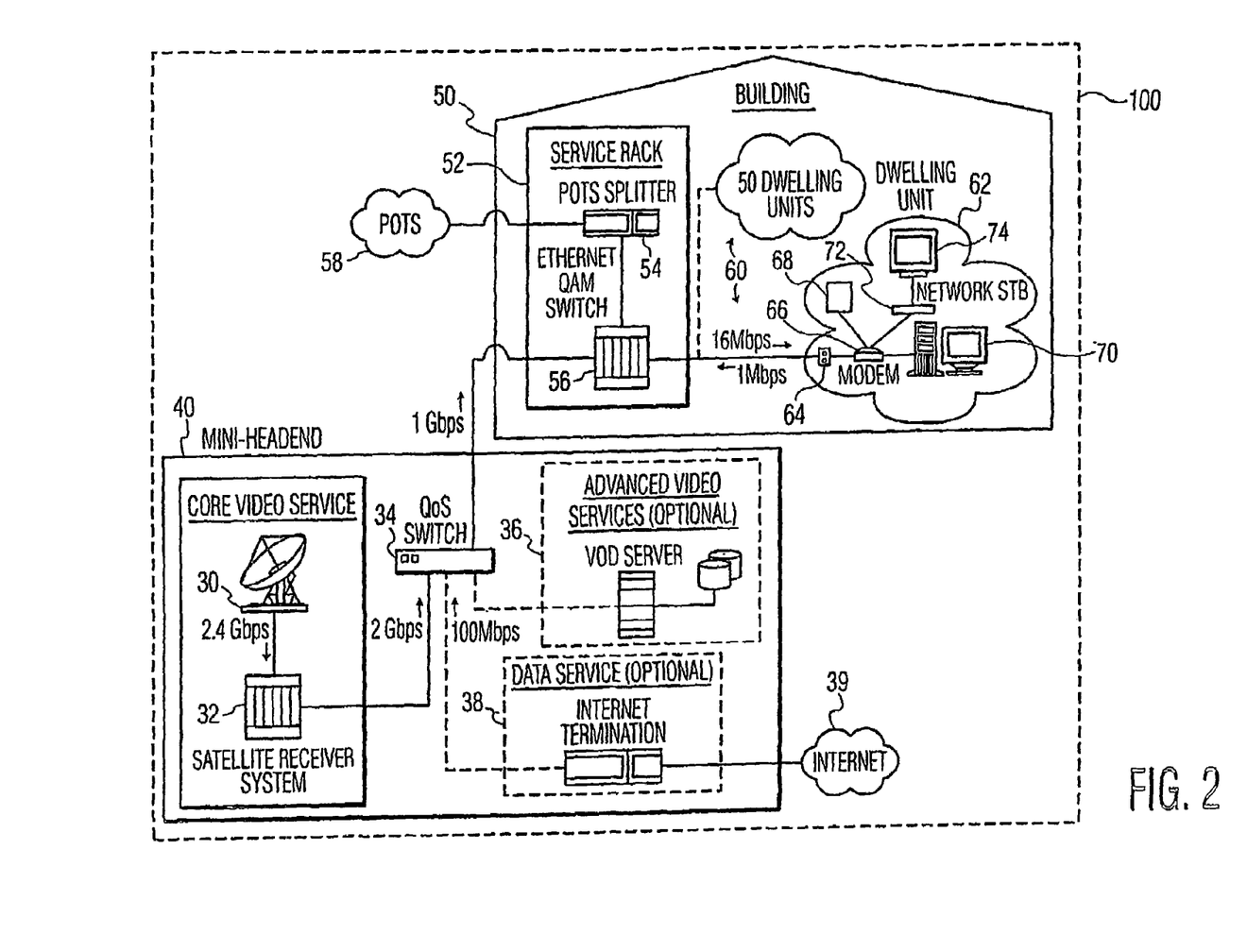
FIG. 2 is a representation of another exemplary satellite signal distribution system in accordance with the principles of the subject invention.

In FIG. 2, there is depicted another exemplary embodiment of a satellite system generally designated 100. The satellite system 100 includes a mini-headend 40 that is connected to a building or other distribution structure (such as an MDU or multiple dwelling unit 50. The mini-headend 40 receives the plurality of satellite signals via an antenna (dish) 30 which directs the signals to a satellite receiver system 32. The satellite receiver system 32 performs the headend functions described above. The mini-headend 40 includes a QoS (Quality of Service) switch 34 that can optionally add advanced video services 36 and/or optionally add data service 38 from the Internet 39. In all cases, the QoS switch 34 is connected to the service rack 52 preferably, but not necessarily, via a 1 Gigabit per second (Gbps) connection. The service rack 52 receives the plurality of converted and IP multicast added satellite signals via an Ethernet/QAM switch 56. The Ethernet/QAM switch 56 is connected to a POTS splitter 54 that is connected to a POTS for telephone service thereto.

The Ethernet/QAM switch 56 directs telephone signals from the POTS splitter and satellite signals from the mini headend 40 to one or more dwelling units 62 via the xDSL, as an example, network 60. Each dwelling unit includes a telephone jack 64 that provides access for an xDSL modem 66. The modem 66 allows connection thereto by a telephone 68, a computer 70 via an Ethernet connection, a network set top box (e.g. satellite receiver) 72 via an Ethernet connection that is connected to a display or monitor 74. Each one of the dwellings 62 may therefore join in one or more multicasts.

It should be appreciated that there may not necessarily be a one-to-one correlation or correspondence between MPEG (DirecTV) packets and Ethernet/IP packets. There may be, for example, 10 MPEG packets put into a single IP multicast packet, which would then be put into an Ethernet multicast packet. Various combinations are contemplated.

Figure 6:
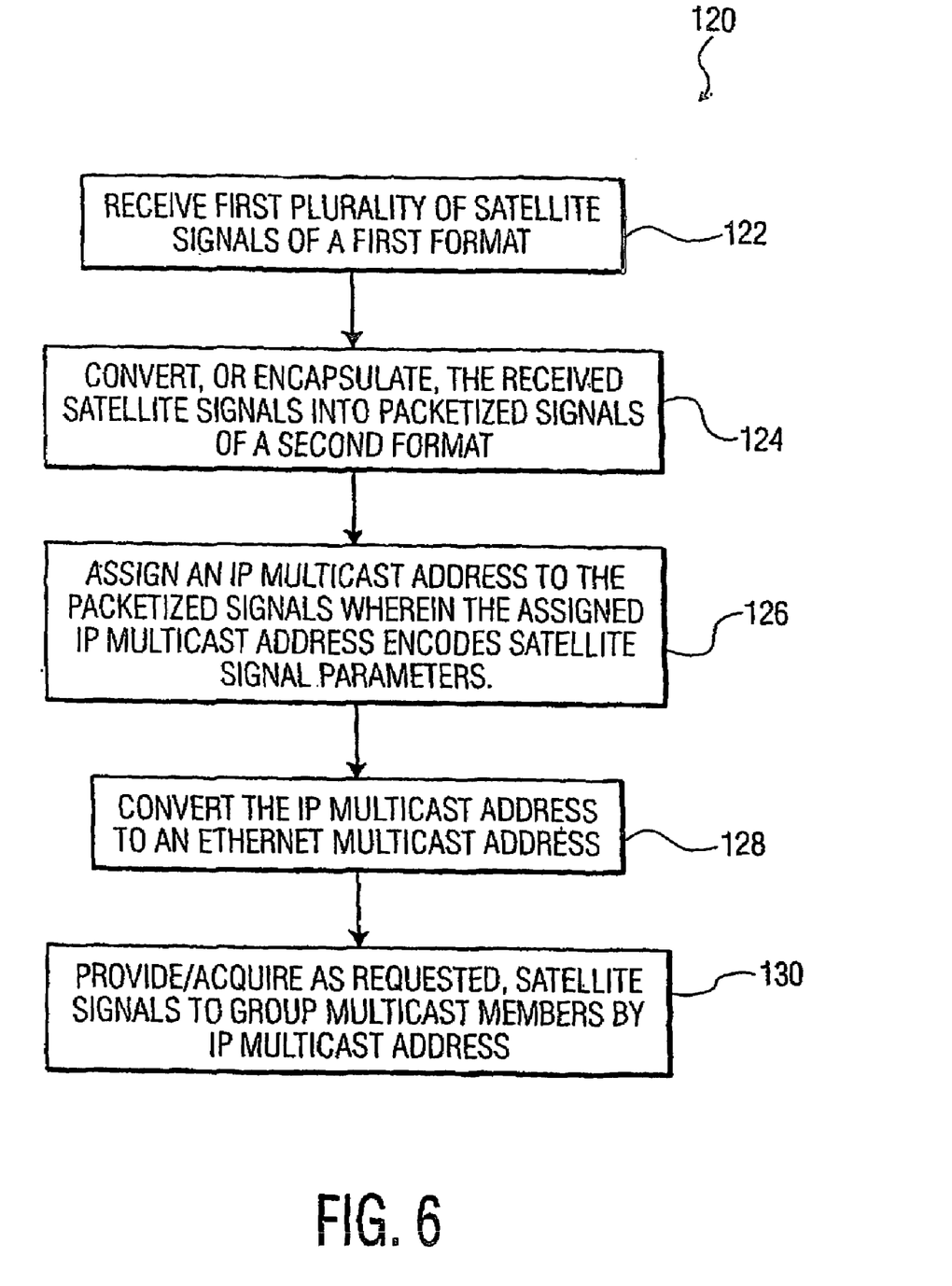
FIG. 6 is a flowchart of an exemplary manner of operation of a satellite system in accordance with the principles of the subject invention.

Referring now to FIG. 6, there is depicted a flowchart, generally designated 120, of an exemplary manner of operation of a satellite system in accordance with the principles of the subject invention. In step 122, first satellite signals (e.g. a plurality of first satellite signals) of a first format are received. In step 124, the received first satellite signals are converted, or encapsulated, into packetized data according to a second format. In step 126, the packetized data is assigned an IP multicast address according to an encoding scheme between the parameters of each satellite signal and bits of its assigned IP muiticast address. Particularly, certain bits of the assigned IP multicast address encode the satellite parameters. This correlates each satellite signal (or elementary stream) to a particular IP multicast address (and vice versa).

In step 128, each IP multicast address is converted into an Ethernet multicast address for use over Ethernet networks and/or Ethernet components. The elementary stream will be equated with the particular Ethernet/IP multicast address. Thereafter, in step 130 the encapsulated satellite signals are provided for acquisition over an Ethernet to group multicast members by Ethernet/IP multicast address. A component such as a set top box, requests to join in the reception of the elementary stream packets corresponding to a particular channel.

It should be appreciated that the flowchart 120 described above and depicted in FIG. 6 provides a complete manner of exemplary operation of the subject satellite receiving system as described herein. Every step, however, is not necessary for implementation of the subject invention. The subject invention may be implemented utilizing a smaller number of steps than all of the steps of the flowchart 120. This may be reflected in the claims. Moreover, more or less steps in alternative embodiments of the procedure, method or operation 120 may implement the subject invention in accordance with the principles recited herein. As well, subsets of the above procedure 120 may implement the principles of the subject invention rather than the entire procedure. Variations are also contemplated.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and that fall within the limits of the appended claims.

What is claimed is:

1. A method of receiving a packetized program stream from a satellite source and distributing the packetized program stream through a data network, comprising the steps of:

receiving a plurality of packetized program streams from the satellite source, each packetized program stream having associated therewith program identification information;

receiving a request for a particular packetized program stream, the request including a multicast address;

determining program identification information and satellite identification information associated with the particular packetized program stream using a predetermined algorithm and the multicast address;

tuning to a selected satellite and acquiring the particular packetized program stream using the determined satellite identification information and the program identification information; and transmitting, on the data network, the particular packetized program stream in accordance with a transport format associated with the data network using the multicast address.

2. The method according to claim 1, wherein the data network comprises an Ethernet based network, and the transmitting step comprises encapsulating the particular packetized program stream according to the Internet Protocol transport format.

3. The method according to claim 2, wherein the determining step comprises determining a program ID (PID), satellite number, and transponder number in response to the multicast address.

4. The method according to claim 3, wherein the determining step comprises determining the program ID (PID), satellite number, and transponder number from predetermined bit positions in the multicast address.

5. The method according to claim 4, wherein the program ID (PID) is disposed in bits 0-12, the satellite number is disposed in bits 13-15, and the transponder number is disposed in bits 18-22 of the multicast address.

6. A method of receiving a packetized program stream and distributing the packetized program stream through a data network, comprising the steps of:

receiving a plurality of packetized program streams from a signal source, each packetized program stream having associated therewith program identification information;

receiving a request for a particular packetized program stream, the request including a multicast address;

determining program identification information associated with the particular packetized program stream using a predetermined algorithm and the multicast address;

acquiring the particular packetized program stream using the determined program identification information; and transmitting, on the data network, the particular packetized program stream in accordance with a transport format associated with the data network using the multicast address.

7. The method according to claim 6, wherein the data network comprises an Ethernet based network, and the transmitting step comprises encapsulating the particular packetized program stream according to the Internet Protocol transport format.

8. The method according to claim 7, wherein the determining step comprises determining a program ID (PID) number in response to the multicast address.

9. The method according to claim 8, wherein the determining step comprises determining the program ID from predetermined bit positions in the multicast address.

10. A method for receiving a packetized program signal in a data network, comprising the steps of:

receiving a user request for a particular packetized program stream from a plurality of packetized program streams;

determining a multicast address associated with the particular packetized program stream using a predetermined algorithm and identification information associated with the particular packetized program information;

transmitting a request for the particular packetized program stream, the request including the multicast address, to a device coupled to a source of the plurality of packetized program streams;

acquiring, from the data network, packetized data having the particular program stream included therein and being associated with the multicast address; and deriving the packetized program stream from the acquired packetized data.

11. The method according to claim 10, wherein the data network comprises an Ethernet based network, and the acquiring step comprises acquiring the particular packetized program stream that is encapsulated according to the Internet Protocol transport format.

12. The method according to claim 11, wherein the plurality of packetized program streams are received from a satellite signal source.

13. The method according to claim 12, wherein the determining step comprises determining the multicast address in response to a program ID (PID), satellite number, and transponder number associated with the particular packetized program stream.

14. The method according to claim 13, wherein the determining step comprises mapping the program ID (PID), satellite number, and transponder number into predetermined bit positions in the multicast address.

15. A method of receiving a packetized program stream from a signal source and distributing the packetized program stream through a data network, comprising the steps of:

a) receiving, in a first device coupled to the data network, a plurality of packetized program streams from the signal source;

b) receiving, in a second device coupled to the data network, a user input selecting a particular packetized program stream from the plurality of packetized program streams;

c) determining, in the second device, a multicast address associated with the particular packetized program stream using a predetermined algorithm, and transmitting a request for the particular packetized program stream including the determined multicast address to the first device;

d) determining, in the first device, identification information associated with the particular packetized program stream in response to the request using the predetermined algorithm and the multicast address;

e) acquiring, in the first device, the particular packetized program stream in response to the identification information, and transmitting the particular packetized program stream through the data network in accordance with a transport format of the data network using the multicast address; and f) receiving, in the second device, the particular packetized program stream in response to packetized data transmitted with the multicast address.

16. The method according to claim 15, wherein the data network comprises an Ethernet based network, and step e) comprises encapsulating the particular packetized program stream according to the Internet Protocol transport format.

17. The method according to claim 16, wherein step c) comprises determining the multicast address in response to a program ID (PID), satellite number, and transponder number associated with the particular packetized program stream.

18. The method according to claim 17, wherein step c) comprises mapping the program ID (PID), satellite number, and transponder number associated with the particular packetized program stream into predetermined bit positions in the multicast address.

19. The method according to claim 18, wherein step d) comprises determining the program ID (PID), satellite number, and transponder number from predetermined bit positions in the multicast address.

20. A digital server for receiving a packetized program stream from a satellite source and distributing said packetized program stream through a network, comprising:

means for encapsulating said packetized program stream in a first transport protocol into packetized data in a second transport protocol;

means for assigning a unique internet protocol multicast address to each packetized program stream, whereby satellite identification data is mapped to said uniquely assigned internet protocol multicast address; and a plurality of receivers to which to distribute said packetized data, wherein a group of said plurality of said receivers form a internet protocol multicast group.

21. The digital server according to claim 20, wherein said packetized program stream is in digital protocol/format.

22. The digital server according to claim 20, wherein said satellite identification data includes a satellite identification, a transponder identification and a transport protocol format program identification.

23. The digital server according to claim 20, further comprising a quality of service switch.

24. The digital server according to claim 23, wherein said quality of service switch is connected to an ethernet quadrature amplitude modulation switch for distribution of packetized data to at least one receiving unit.

25. The digital server according to claim 24, wherein said ethernet quadrature amplitude modulation switch is connected to a plain old telephone service switch for distribution of telephone service.

26. A plurality of satellite receivers for receiving packetized data, comprising:

a group of said plurality of satellite receivers forming a first internet protocol multicast group, each satellite receiver of said group of satellite receivers being Ethernet capable;

each satellite receiver of said group of satellite receivers, further comprising:

means for processing packetized data;

means for tuning to at least one satellite elementary packet stream via its multicast address;

means for receiving program or service guide information;

means for receiving a command to change channels;

means for dis-associating from said first internet protocol multicast group; and means for associating with a second internet protocol multicast group based on a channel change.

* * * * *

UNITED STATES PATENT AND TRADEMARK OFFICE
CERTIFICATE OF CORRECTION

PATENT NO. : 7,617,326 B2 Page 1 of 1
APPLICATION NO. : 10/549825
DATED : November 10, 2009
INVENTOR(S) : Gervais et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Nineteenth Day of October, 2010

David J. Kappos
*Director of the United States Patent and Trademark Office*